3,270,058
RECOVERY OF AROMATIC AMINES FROM ARO-
MATIC ORTHO-DIAMINES BY DISTILLATION IN
THE PRESENCE OF A COMPOUND OF BORON
David Sutcliffe, Manchester, England, assignor to Imperial
Chemical Industries Limited, London, England, a corporation of Great Britain
No Drawing. Filed June 26, 1963, Ser. No. 290,590
Claims priority, application Great Britain, July 2, 1962,
25,218/62
7 Claims. (Cl. 260—582)

The present invention relates to the purification of aromatic amines, in particular to the removal of ortho-diamines from mixtures of aromatic amines.

It has already been proposed to purify aromatic amines by solvent crystallisation processes and in particular it has been proposed to remove ortho-diamines from mixtures containing ortho- and meta-diamines by a solvent crystallisation process. Crystallisation processes suffer from the disadvantage that apart from partially removing the ortho-diamine they also remove other isomers and lead to undesirable alterations and variations in the isomer content of the purified product.

It has now been found that ortho-diamines may be conveniently removed from mixtures of aromatic amines by distilling a mixture of such amines in the presence of boric acid or a substituted boric acid or derivatives thereof.

Thus according to the present invention there is provided a process for the purification of aromatic amines comprising the removal of ortho-diamines from said aromatic amines by distilling said aromatic amines in the presence of a boric acid, a boronic acid, or an ester or anhydride of such acids.

Any mixture of aromatic amines containing ortho-diamines may be purified by the process of the present invention.

Examples of aromatic amines from which ortho-diamines may be removed by the present process include amongst others aniline, meta-phenylenediamine, para-phenylene diamine, 2:4-, 2:5- and 2:6-tolylene diamines, ortho-, meta- and paratoluidines.

The present process has proved particularly valuable for removing ortho-diamines from the mixture of tolylene-diamines obtained by reduction of the dinitration product of toluene. The main proportion of the mixed tolylene diamines obtained on reduction of the dinitration product of toluene consists of the 2:4- and 2:6-tolylene diamines, that is the meta diamines, but the mixture also contains ortho tolylene diamines. One of the major uses of the mixed tolylene diamines is for the manufacture of tolylene diisocyanate for use in the manufacture of polyurethanes. For the manufacture of tolylene diisocyanate it is essential that the ortho-diamine content of the tolylene diamines should be at a very low level as the presence of ortho-diamine leads to the formation of by-products which result in a lowering of the yield and cause difficulty in the subsequent purification of the diisocyanate particularly at the flash distillation stage. The present process results in removal of, or a considerable reduction in the ortho-diamine content of these particular tolylene diamine mixtures and use of the purified diamines in tolylene diisocyanate manufacture gives increased yield and improved manufacturing performance, i.e. output from a given plant. In addition the purification of tolylene diamines by the present process does not result in any significant change in the ratio of the 2:4- and 2:6-tolylene diamines; this is particularly advantageous when the diamines are to be converted to diisocyanates as the isomer ratio of the derived tolylene-2:4- and 2:6-diisocyanates is of critical importance in the manufacture of polyurethanes particularly polyurethane foams.

Thus as a preferred embodiment of the present process there is provided a process for the purification of tolylene diamines by the removal of ortho-diamines therefrom by distilling said tolylene diamines in the presence of a boric acid, a boronic acid or an ester or anhydride of such acids.

Any boric or substituted boric acid, that is a boronic acid, may be used in the process of the present invention, as may any ester or anhydride of such acid.

Examples of suitable boric or boronic acids include amongst others orthoboric acid, tetraboric acid, metaboric acid, the polyboric acids, butyl boronic acid, phenyl boronic acid, tolyl boronic acid, naphthyl boronic acid and dodecyl boronic acid.

Examples of suitable esters or anhydrides of such acids include amongst others ethyl ortho-borate, butyl ortho-borate, phenyl ortho-borate, tolyl ortho-borate, triethyl borate, and phenyl boronic anhydride.

The process may be conveniently carried out by adding the boric acid, boronic acid or derivative thereof to the aromatic amines and then simply distilling the amines, the unwanted ortho diamines remaining behind in the still residue.

Distillation may be carried out at atmospheric pressure or under reduced pressure, distillation under reduced pressure being normally used when the amines have a very high boiling point or tend to decompose at high temperature.

The amount of boric acid, boronic acid or derivative thereof used in the present process may vary over wide limits and will be partly dependent on the amount of ortho-diamine to be removed, the amount normally used is between 0.5% and 5% preferably between 1% and 3% of the weight of the total amines to be distilled.

The present process is far more efficient than straight-forward distillation without the boric, boronic acid or derivative thereof; as is demonstrated by the following figures which were obtained by carrying out the distillation of tolylene diamine (mixed isomers) at 180° C. at 30 mm. pressure of mercury under standard conditions.

TABLE 1

| Percent H₂BO₃ added before distillation | 0 | 1 | 2 | 5 |
|---|---|---|---|---|
| Percent orthodiamines in distillate | 3.1 | 1.2 | 0.5 | 0.4 |

The invention is illustrated but not limited by the following examples in which all parts and percentages are by weight except where otherwise stated.

*Example 1*

To 110.3 parts of tolylene diamine (mixed isomers, mainly 2:4- and 2:6- in 80:20 proportions) containing 5.5% ortho diamine isomers is added 5.5 parts of tetraboric acid, and the mixture distilled. Distillation begins at 273° C. and is continued to 290° C. the main bulk of the material passing over, water-white, at 280–282° C. The distillate, pale cream on solidification, contains 0.6% ortho diamine isomers.

*Example 2*

To 30.3 parts of tolylenediamine (mixed isomers, mainly 2:4- and 2:6- in 80:20 proportions) containing 2.5% ortho isomers is added 0.61 part of orthoboric acid. A small quantity of distillate, mainly water, is removed at 50 mm. Hg and 130° C. (bath temperature), followed by the diamine, boiling at 174–6° C./30 mm. Hg (under nitrogen). The product, essentially the 2:4/2:6-isomers is white on solidification, and contains 0.5% ortho diamine isomers.

Example 3

To 100 parts of tolylene diamine (mixed isomers, mainly 2:4- and 2:6- in 80:20 proportions) containing 3.1% of ortho diamine isomers is added 3 parts of phenylboronic acid, and the mixture distilled. The diamine distils at 174–176° C./30 mm. Hg (under nitrogen). The product, essentally the 2:4/2:6-isomers contains 1.13% ortho diamine isomers.

Example 4

As Example 3 but using 5 parts of tri-n-butyl borate in place of 3 parts of phenylboronic acid. The distillate contains 1.4% ortho diamine isomers.

Example 5

As Example 3 but using 3 parts of phenylboronic anhydride in place of 3 parts of phenylboronic acid. The distillate contains 0.6% ortho diamine isomers.

What I claim is:

1. Process for the purification of aromatic amines comprising the removal of aromatic ortho-diamines from said aromatic amines by distilling said aromatic amines in the presence of a compound of boron selected from the group consisting of boric acids, boronic acids and esters and anhydrides of boric and boronic acids.

2. Process for the purification of aromatic amines according to claim 1 in which the amount of the compound of boron used lies between the limits of 0.5% and 5% of the weight of the total amines to be purified.

3. Process for the purification of a mixture of tolylene diamines comprising the removal of aromatic orthodiamines from the said mixture by distilling said mixture in the presence of a compound of boron selected from the group consisting of boric acids, boronic acids and esters and anhydrides of boric and boronic acids.

4. Process for the purification of a mixture of tolylene diamines according to claim 3 in which the mixture of tolylene diamines consists mainly of a mixture of 2:4- and 2:6-tolylene diamines.

5. Process for the purification of a mixture of tolylene diamines according to claim 3 in which the mixture of tolylene diamines is obtained by reduction of the dinitration product of toluene.

6. Process for the purification of a mixture of tolylene diamines according to claim 3 in which the amount of the compound of boron used lies between the limits of 0.5% and 5% of the weight of the mixture of tolylene diamines to be purified.

7. Process for the purification of a mixture of tolylene diamines according to claim 3 in which the compound of boron is selected from orthoboric acid and tetraboric acid.

References Cited by the Examiner

UNITED STATES PATENTS

| | | | |
|---|---|---|---|
| 2,850,440 | 9/1958 | Shrader et al. | 203—34 |
| 2,946,821 | 7/1960 | Schenck et al. | 260—582 |
| 2,946,822 | 7/1960 | Schenck et al. | 260—582 |

NORMAN YUDKOFF, *Primary Examiner.*

WILBUR L. BASCOMB, JR., *Examiner.*